May 26, 1964 J. B. MINTER 3,134,635

STATISTICAL GRAPH-FORMING RECORDER

Filed April 26, 1963 4 Sheets-Sheet 1

INVENTOR.
JERRY B. MINTER
BY John J. Rogan
ATTORNEY

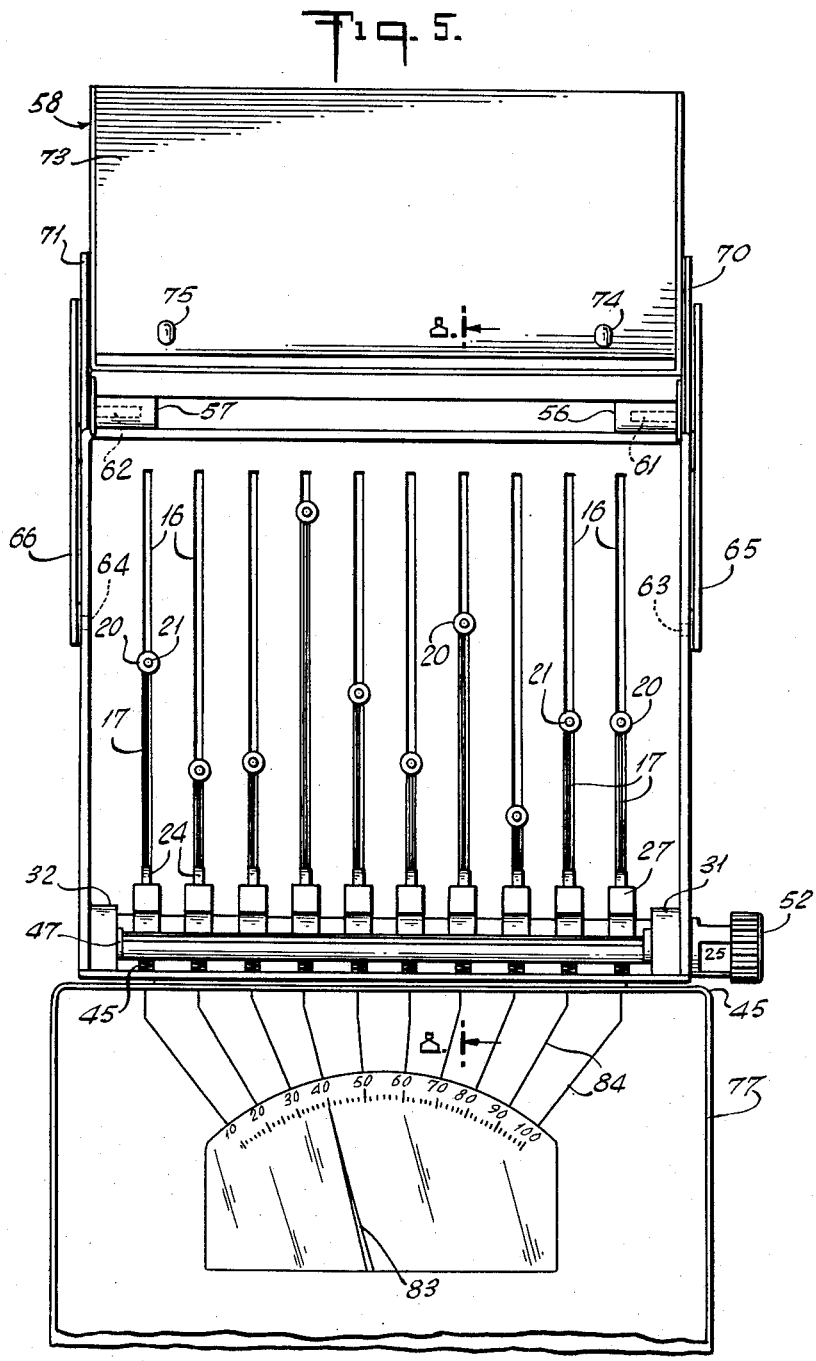

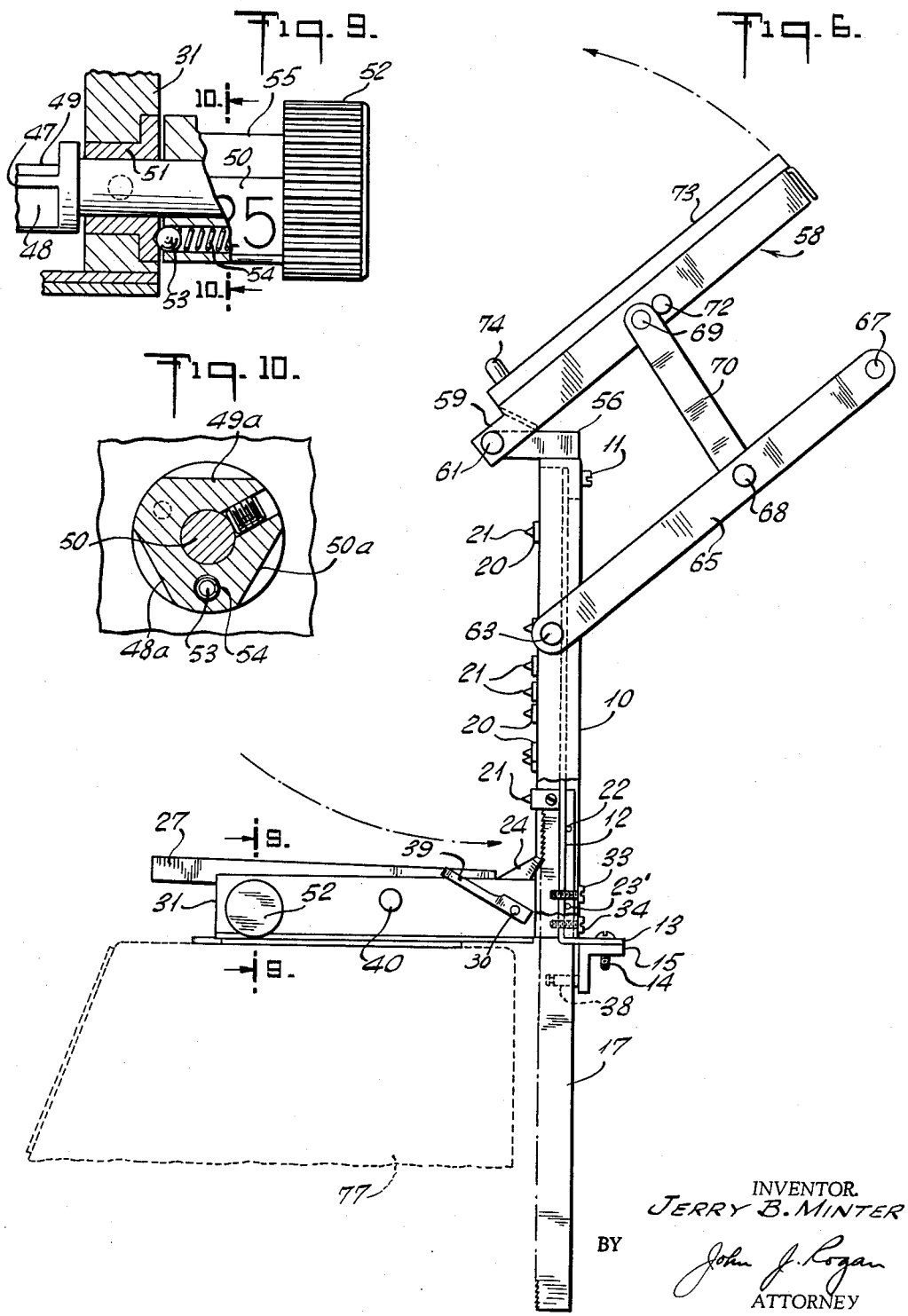

May 26, 1964  J. B. MINTER  3,134,635
STATISTICAL GRAPH-FORMING RECORDER
Filed April 26, 1963  4 Sheets-Sheet 4
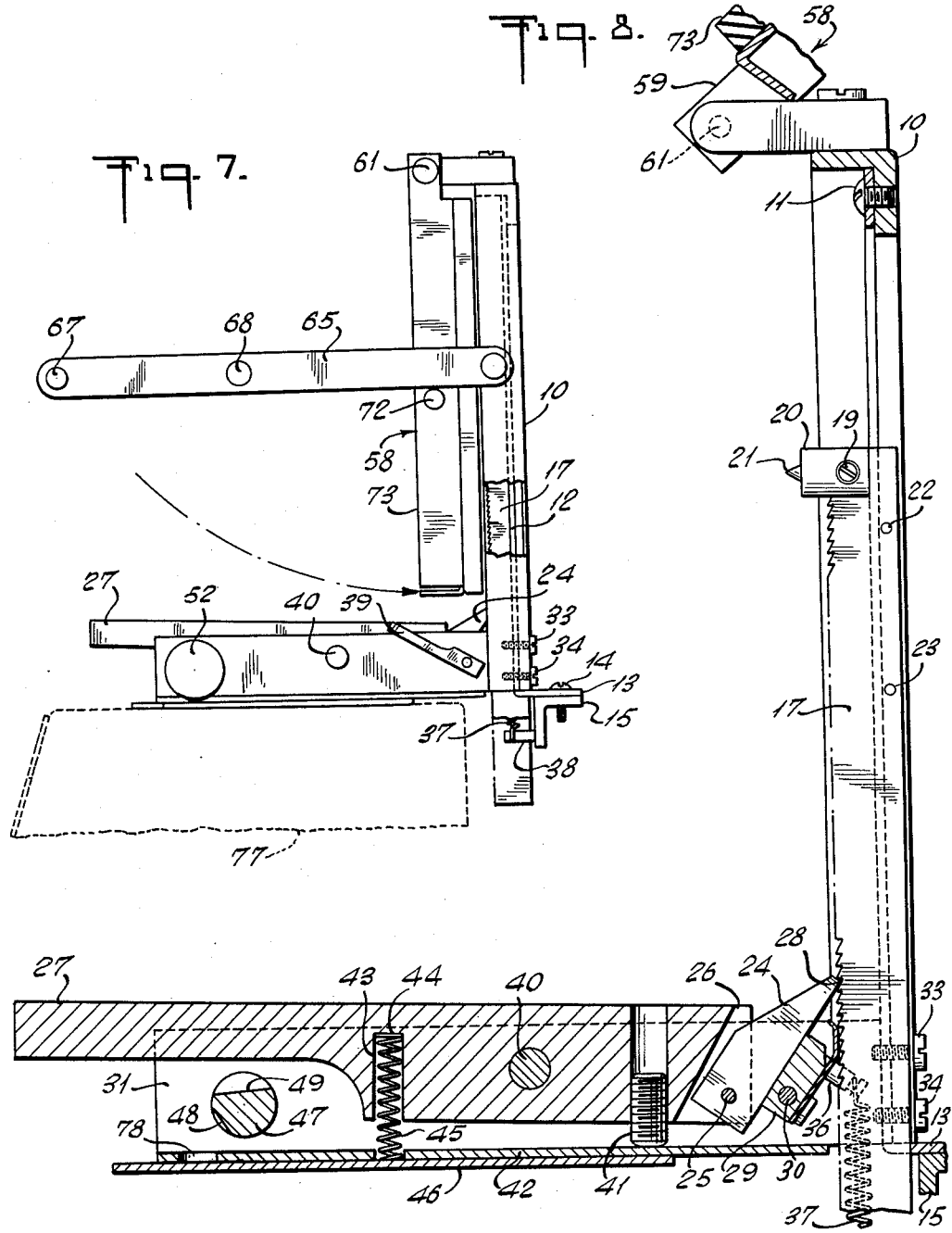
INVENTOR.
JERRY B. MINTER
BY John J. Logan
ATTORNEY

United States Patent Office

3,134,635
Patented May 26, 1964

3,134,635
STATISTICAL GRAPH-FORMING RECORDER
Jerry B. Minter, Normandy Heights Road,
Morristown, N.J.
Filed Apr. 26, 1963, Ser. No. 275,814
9 Claims. (Cl. 346—17)

This invention relates to recording systems and more particularly it relates to apparatus for translating informational data into graph-like form.

In numerous arts it is desirable to make a permanent record in the form of a graph or similar trace of information obtained from any suitable source. This is particularly true where the information is to be graphed in percentile form. For example, in the testing of large batches of electrical components such as transistors, a number of items may be so large as not to warrant an individual test of each item. Nevertheless, some definite information must be obtained as to the percent of the items coming within certain specific required parameters. Thus, in the case of transistors, which are mentioned merely by way of illustration, a batch of 1,000 or more may be received for test and because of time considerations and the like, it is not feasible to test each individual transistor for any given characteristic, for example, breakdown voltage.

The usual procedure is to select at random a certain number of the total batch for sample testing and to write down the results of each individual item tested. However, with such conventional sample testing, it is necessary to collate and evaluate the individual and total test results, to determine whether the total batch should be accepted, rejected or retested. This involves elaborate collating and percentage calculations which are time consuming and depend upon the accuracy of the collating and percentile computations.

Furthermore, the test specifications may vary from batch to batch. For example, if 1,000 transistors are to be sampled for testing, the specifications may require a test on only a relatively small number, for example 25%; other specifications may require the testing of 50% or even 100% of the batch. In any case, it is important to know the percent of the actually tested items which come within certain specific parameters. For example, if the items are being tested for breakdown voltage, it is important to know what percent are within certain breakdown voltage ranges.

Accordingly, one of the principal objects of the invention is to provide a simple, accurate and flexible device for ascertaining in graph-like form, the results of informational sampling tests on a wide variety of devices.

Another object is to provide a percentile evaluation device for producing a permanent record in graph-like form of statistical or test data.

Another object is to provide a percentile evaluation device for statistical recording systems which can be operated, and the results directly evaluated, by non-expert personnel.

A feature of the invention relates to a device comprising a key-operated mechanism wherein the operation of the keys, in accordance with statistical data allotted to each key, sets up a plurality of graph-producing elements. These elements, when statistically set, can be used in coordination with an appropriately marked sheet or card, to produce directly thereon a graph-like percentile record of the statistical data.

Another feature relates to a device of the key-operated kind for producing a graph-like record of statistical data, and wherein the device can be expeditiously adjusted to produce a graph-like record with any desired percent of samples randomly chosen from a large batch of items to be tested.

A further feature relates to a key-operated tallying recorder which can be directly attached to, or supported adjacent to an electrical indicator such, for example, as a voltmeter, and wherein the various readings of the voltmeter representing statistical testing of randomly chosen items from a large batch are positionally correlated with the keys of the device so that even inexperienced personnel can be informed as to the key or keys to be operated.

A further feature relates to a novel keyboard-controlled tallying and graph-like forming device.

A further feature relates to a simplified statistically operated device for setting up a plurality of card-marking elements in graph-like array, in conjunction with a card operating mechanism for enabling the card to be marked or pierced in correlation to the setting of the said elements.

A still further feature relates to the novel organization, arrangement and relative location and interconnection of parts which cooperate to provide an accurate and simplified graph-forming mechanism.

Other features and advantages not specifically enumerated will be apparent after consideration of the following detailed descriptions and the appended claims.

In the drawing, which shows by way of example one preferred form,

FIG. 5 is a front elevational view of FIG. 1;

FIG. 6 is a right-hand elevational view of FIG. 5 showing the relation bbetween the card-supporting frame and the card-marking elements when the frame is in its normal position;

FIG. 7 shows the relation wherein the card-supporting frame is moved to the card-marking or piercing position;

FIG. 8 is a cross-sectional view of FIG. 5 taken along the line 8—8 thereof and viewed in the direction of the arrows;

FIG. 9 is a cross-sectional view of FIG. 6 taken along the line 9—9 thereof and viewed in the direction of the arrows;

FIG. 10 is a cross-sectional view of FIG. 9 taken along the line 10 thereof and viewed in the direction of the arrows.

Figure 1:
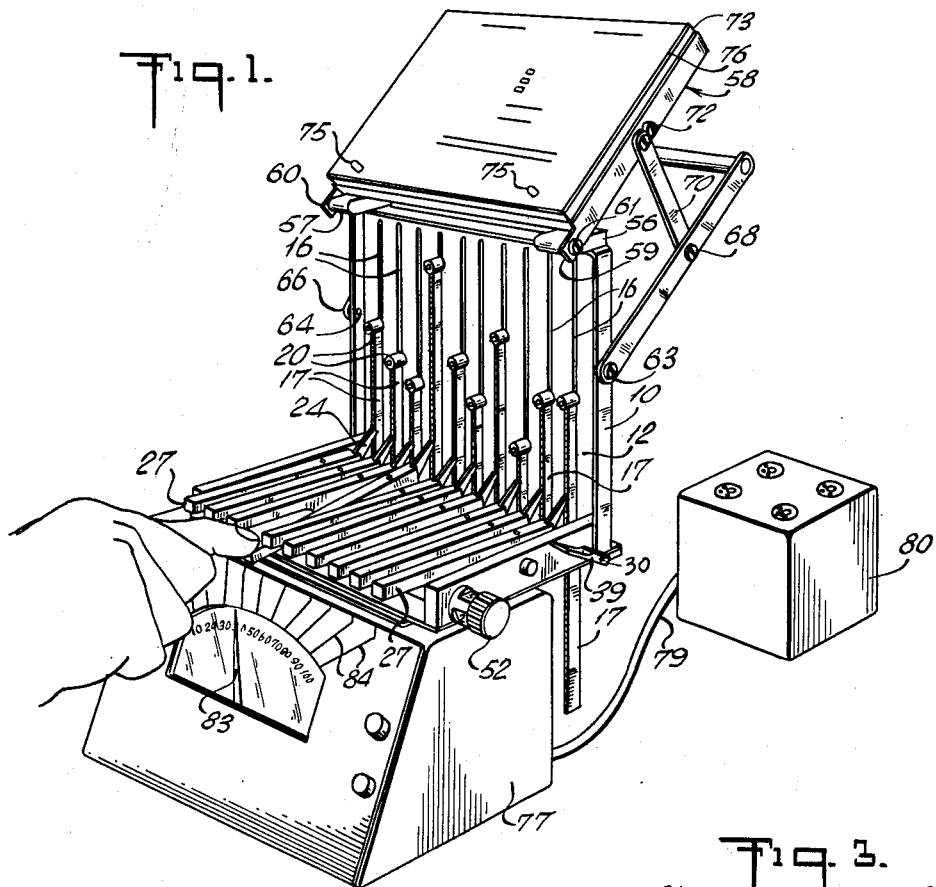
FIG. 1 is a perspective view of a device according to the invention.

While the invention will be described in connection with the testing of such devices as transistors, it will be understood that such is done merely for illustrative and explanatory purposes, and not by way of limitation on any use to which the device is appropriate.

The device comprises an inverted U-shaped frame 10 in which is seated and fastened by screws 11 a thin metal plate 12 having a rearwardly expanding flange 13 at the lower end thereof. Flange 13 is secured by screws 14 to a rigid angle bracket 15.

Plate 12 is provided with a series of parallel slits 16 of equal length and open at their lower ends, each of these slits extending into the flange portion 13, as shown in FIG. 8. Each of these slits receives and acts as a guide for a corresponding series of relatively thin but rigid slides 17 each of which has its front edge provided with a series of 100 equal ratchet teeth 18. Attached to the upper end of each slide 17 by respective set screws 19 is a respective round metal boss 20 formed at its forward end with an integral tapered or needle pointed tip 21. The slides at their rear edges protrude beyond the slitted plate 12 and are constrained to slide in a vertical direction by means of a pair of pins 22, 23 passing through each slide and bearing against the rear face of plate 12. Likewise the rear end of each of the bosses 20 bears against the front face of plate 12. It should be noted that the slits in plate 12 are carried around and expand partially into the flange 13 to prevent the slides from tilting during their sliding movement.

Slides 17 normally drop by their own weight to their lowermost positions at which the lower pin 23 on each slide abuts against the flange 13. However, the sides are arranged to be indexed vertically in a step-by-step fashion, each by a respective pawl 24. Each of the pawls is pivotally mounted at pivot 25 in a recess 26 in the end of the corresponding key lever 27. The pawls tend, by their own weight, to rotate clockwise around the pivot 25 so that the tapered end 28 of each pawl registers with the ratcheted edge of the corresponding slide. In this position, each pawl rests against a flat bar 29 which extends across the slides. Bar 29 has pivots 30 at its opposite ends and is pivotally mounted in a pair of rigid arms 31, 32 fastened at their ends by bolts 33, 34 to the lower end of frame 10.

Bar 29 carries a series of leaf springs 35, one for each of the slides and each arranged to press resiliently against the edge of the corresponding slide. For that purpose, bar 29 has, at its center, a boss 36 to which is attached a coiled tension spring 37, the lower end of that spring being attached to a lug 38 (see FIGS. 6 and 7). As long as bar 29 is in its normal position, as shown in FIGS. 1, 7 and 8, the several pawls are in registry with the teeth of their associated slides, thus preventing the slides from dropping from their previously raised positions. For the purpose of freeing the slides to enable them to drop to their lowermost or normal positions, the pivot 30 extends beyond the arm 31 and has attached thereto a lever 39 (see FIGS. 1, 6 and 7). Thus, by pressing down on lever 39 bar 29 is rotated counter-clockwise and disengages all the pawls from their respective slides, which thereupon drop to their lowermost positions.

The several key levers 27 are mounted for rocking motion on a pivot bar 40 which extends between the arms 31, 32. Threaded into the rear end of each key lever is an adjusting set screw 41 (see FIG. 8), the lower end of which abuts against a flat 42 fastened to the lower faces of arms 31, 32. Each key lever has a recess 43 in which is seated a compression spring 44, the lower end of which registers in a corresponding opening 45 in plate 42. These openings are closed by another plate 46 fastened beneath plate 42. Thus, as seen in FIG. 8, the various key levers are biased in a clockwise direction around the pivot 40 and by means of their individual set screws 41, they can be individually adjusted to make sure that the several pawls properly engage the teeth on their respective slides.

From the foregoing, it will be seen that by depressing any given key lever 27, the corresponding slide 17 can be raised a predetermined unit distance. The throw of each key lever is dependent upon the angular setting of a cam bar 47 which is rotatably mounted in the side frames 31, 32. As shown more clearly in FIGS. 8 and 9, the cam bar has two flats extending along its length, designated respectively 48, 49. The flat 48 is cut from the circumferential length of the bar 47 so as to provide a predetermined throw for the various key levers. Likewise the flat 49 is cut from the length of the bar 47 so as to provide a much larger throw for the key levers. Merely by way of example, the bar 47 is arranged so that when it is turned with the curved surface beneath the various key levers, the depression of any key lever operates the associated slide 17, the distance of one tooth. Thus, in order to raise the associated slide from its normal to its uppermost position, the associated key must be depressed 100 times. On the other hand, when the bar 47 is turned so that the flat 48 is beneath the key levers, the throw is such that the associated slides are moved a distance of four teeth for each key operation. Thus it requires 25 operations of any given key to raise the associated slide from its normal to its uppermost position.

Likewise when the bar 47 is turned to locate the flat 49 beneath the key levers, the throw is such that the operation of any key causes the associated slide to be raised two teeth, thus requiring 50 successive operations to raise a slide from its normal to its highest position. In order to turn the bar 47 and to indicate the desired throw, the said bar has a reduced spindle end portion 50 (see FIG. 9) which passes through a bearing member 51 fitted into the slide bar 31. Suitably fastened to the projecting end of spindle 50 is a knurled knob 52 which has seated in the neck thereof detent ball 53 and pressure spring 54. The ball 53 cooperates with three respective depressions in the bearing member 51, these depressions being located in correlated relation with the flats 48, 49 to lock the cam bar 47 in any one of its three positions. As indicated in FIG. 10, the neck portion 55 of knob 52 may be provided with flats 48a, 49a corresponding to the flats 48, 49 and with an additional flat 50a corresponding to the unflat surface of bar 47. These flats on the knob 52 may be printed with the appropriate throw designations above mentioned, namely "25," "50" and "100."

Fastened to the upper or crosspiece end of frame 10 are two blocks 56, 57 (see FIG. 1) which extend forwardly of the frame 10. Swingably mounted on blocks 56, 57 is a card-carrying platen 58 which has a pair of lugs 59, 60 pivotally supported on pivot pins 61, 62. Platen 58 is shown in its normal or non-recording position in FIG. 6 and is arranged to be swung to its recording position, as shown in FIG. 7 wherein it abuts against the pointed tips 21 carried by the several recording members 20 on the respective slides 17. For the purpose of manipulating the platen, there is pivotally attached at 63, 64 on the sides of frame 10, a bail comprising the side arms 65, 66 and the cross-arm 67. Pivotally linked at 68, 69 to the side of platen 58 is a link 70. A similar link 71 is pivotally attached to the arm 60 and to the opposite side of platen 58. Thus, by grasping the bail rod 67, the platen can be swung from its card-loading position shown in FIG. 6 to its card-recording position shown in FIG. 7. In this latter position the arms 65, 66 engage respective stop lugs 72 on the sides of the platen. It should be observed that the members 65 and 70 constitute in effect a toggle which locks the platen in either its card-loading position or in its card-recording position. Cemented or otherwise attached to the face of platen 58 is a resilient pad 72. The face of platen 58 also has a pair of integral rounded pins 74, 75 to locate a specification or test card 76 on which the test data in graph-like form is to be recorded.

Figure 2:
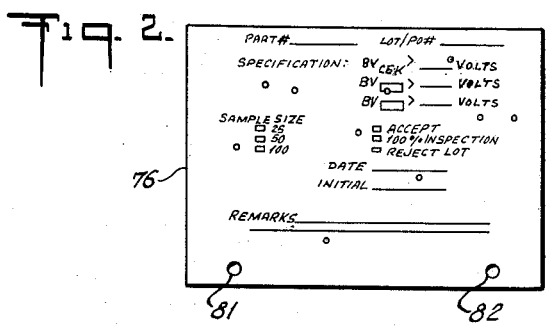
FIG. 2 is a front view of a typical record card that is used with the device of FIG. 1.
Figure 3:
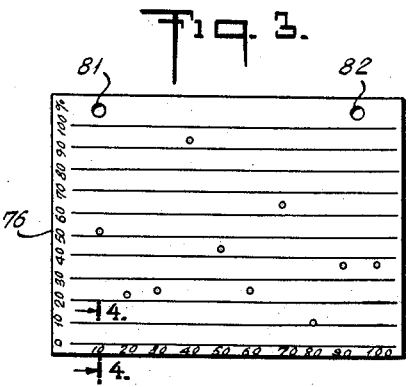
FIG. 3 is a rear view of the card of FIG. 2.

One typical card is shown in FIGS. 2 and 3. On the front of the card are printed the various data identifying the parts or device to be tested. Also there is entered on the card the parameter specified for test, which for example, may be a predetermined breakdown voltage. The card has also checked off the number of items to be used in the sampling batch. For example, if the total number of items is 1,000, the card would indicate that a batch of 25 are to be picked at random for test.

Figure 4:
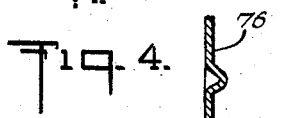
FIG. 4 is a cross-sectional view of part of the card of FIGS. 2 and 3, taken along the line of 4—4 of FIG. 3.

It should be observed that preferably when the platen with its card is pressed against the recording member 20, the tips 21 thereof, preferably emboss the card without any substantial cutting or perforation thereof. I have found that this is desirable since it avoids the accumulation of card punchings which would otherwise tend to clog the mechanism. FIG. 4 shows in cross-section a typical magnified section of an embossed mark on the card of FIG. 3.

The manner of using the device is along the following lines. It can be mounted on top of any suitable electric indicator, such as a voltmeter 77. If desired, the plate 42 can be provided with two slotted openings 78 on opposite sides and arranged to fit over a corresponding pair of locking lugs (not shown) on the top of the voltmeter to lock the device in place. The voltmeter can be connected by suitable conductors 79 to a test device 80 of any well known form, into which can be plugged the items to be tested.

On the assumption that the specification card specifies that the sampling batch is 25 items chosen from a much larger group, and on the assumption that the permissible breakdown voltage is 60 volts, as indicated by the card, the card is mounted upon the platen 58 and is located thereon by having two holes 81, 82 which fit over the platen locating pins 74, 75. The first of the test batch is then inserted into the test device 80 and causes the needle 83 of the voltmeter to be deflected. The face of the voltmeter, adjacent to scale thereof, may be provided with diverging indicator lines 84 which at their diverging ends, terminate beneath respective key levers 27. On the assumption that the needle 83 is deflected to the 40 volt position, this indicates to the operator that the fourth key from the left, as seen in FIG. 1, is to be depressed. Since it is assumed that 25 items are to be tested, the knob 52 had been previously turned to display the numeral 25, so that each depression of a key lever causes the associated recording member 20 to be indexed vertically four units, it being understood that each unit is represented by a single tooth on the associated slide. The first item tested is removed from the device 80 and replaced by the next item of the batch. If the test causes the needle 83 to be deflected to the position 90 on the voltmeter scale, this indicates that the number 9 key lever is to be depressed. After the 25 items have thus been tested, the recording members 20 will have been moved to their respective positions, which define a graph-like contour. Thereupon the platen 58 is swung to press the card against the said recording members and the points 21 thereof emboss the card on the reverse side, as indicated in FIG. 3. The card carries at the bottom edge thereof uniform markings 0–100 corresponding to the scale divisions on the meter 77 and one edge of the card is marked in percentages 0–100%. A permanent graph-like record is therefore made of the tested batch in the form of embossings on the card.

A visual examination of the graph embossed on the card will indicate the percentage of the items having the tested characteristic within a certain range. For example, in the particular graph record shown in FIG. 3, a relatively small percent of the items will have a characteristic below the 40% range. This may indicate that the total batch is acceptable. If the graph shows a much larger percentage in the lower end of the range, this may indicate that the entire batch is to be rejected, or it may indicate that the entire batch should be subjected to 100% inspection and the appropriate marking can be indicated on the front of the card.

If 50 items of the total batch are to be used for test sampling then of course the knob 52 is turned to display the number 50. Under that condition, each operation of a key lever indexes the associated recording member 20 two units per key depression. If 100 items are to be sample tested, then the knob 52 is turned to display the numeral 100, in which case each depression of a key lever indexes the associated recording member one unit distance. This enables the same size of recording card to be used regardless of the number that is selected for random sampling. It will be understood, of course, that while the device is shown with ten key levers and corresponding ten recording members, a greater or lesser number of such keys and recording members may be used. Likewise, while the device is shown for three size of sample batchings, namely "25," "50," and "100," it will be understood that the cam bar 47 can be provided with a smaller or larger number of flats and a corresponding series of numerical indicators on the knob 52, thus correlating the throw of the pawls to correspond with the number in the sample batch.

If desired, the front face of the plate 12 along the left-hand edge, may be provided with percentage markings 0–100% and the horizontally upper edge of that plate may be provided with equally spaced numerical markings, so that if desired, readings may be made directly after the recording members have been set prior to recording on the recording card.

While one particular embodiment of the invention has been illustrated herein, it will be understood that it is done merely for explanatory purposes and not by way of limitation, either as to materials, shapes or dimensions of parts, or uses to which the invention can be applied.

What is claimed is:

1. A recording device comprising marking members movable in parallel paths, a pawl and ratchet combination for each marking member, key levers, one for each marking member, to index them to different positions representative of one of the coordinates of a graph, means common to all said key levers to vary the throw of said pawls, electrical meter having a movable indicator, and a device having a plurality of fixed direction lines, one for each key lever and extending from the key levers to said indicator to indicate the particular key to be operated in accordance with the setting of said indicator.

2. A recording device according to claim 1 in which the means to vary said throw includes a rotatable cam bar extending across the key levers to determine the amplitude of movement of said key levers when actuating their associated pawls.

3. A recording device according to claim 1 in which all said pawls are provided with a pawl release member common thereto, and means are provided to operate said release member to permit all said marking members to restore to their normal positions.

4. In a device of the kind described, the combination of a plate having a plurality of linear spaced parallel guides, a plurality of marking members, a corresponding plurality of reciprocable members supporting said marking members for linear movement along their respective guides, each of said reciprocable members carrying a serrated ratchet, a plurality of manually operable key levers supported for rocking motion, each key lever carrying at one end a pivoted pawl which is normally in engagement with a corresponding one of said ratchets, means common to all said pawls for simultaneously disengaging them from their respective ratchets, a manually rotatable cam bar extending across said key levers to limit the rocking motion thereof and thereby to move each marking member a unit distance or a multiple unit distance for each respective key lever operation, a record-carrying swingable platen movable into pressure-contact with said marking members to impress on the record a graph-like contour defined by the key-controlled positions of said marking members an electrical test and indicating means to directly and visually indicate a particular key lever to be operated.

5. A sampling system for testing a series of items for a predetermined characteristic, comprising means to move a plurality of marking members to various positions to define a graph-like array of said members, a plurality of manually actuated keys, one for each of said marking members to index the corresponding marking member to successive incremental positions, an electrical device having an indicator which is angularly movable to different positions in accordance with the value of respective electric signals, and directional scale means extending between said indicator and said keys for visually correlating the position of said angular movable member with said keys to indicate which particular key is to be operated for each device being tested.

6. A sampling system for testing a batch of devices for the existence of a given characteristic having a range of values, a plurality of movable members, one for each section of said range, a plurality of keys, one for each movable member to index it to successive incremental positions whereby the conjoint setting of said movable members defines a graph-like array, means to test each device of said batch for a predetermined characteristic, and movable indicator means responsive to the value of said given characteristic, and stationary scale means located between said movable indicator means and said keys to indicate directly and visually the order in which said keys are to be operated.

7. A sampling system according to claim 6 in which each of said movable members has an embossing point, a platen swingably mounted and arranged to be brought into embossing pressure against said points, means to control the magnitude of said successive incremental positions in accordance with the number of devices in a given batch being tested, the last mentioned means including a member selectably settable to a series of positions each of which is correlated with the number of devices in the tested batch.

8. A sampling system according to claim 7 in which each of said movable members comprises a vertically slidable ratcheted member and a series of pawls, one for each of said keys, and in engagement with a corresponding one of said ratcheted members to raise said members to said incremental positions, a locking bar for locking all said ratcheted members in their raised positions and means to operate said bar to cause said ratcheted members to drop by gravity to a normal position wherein all said points are in alignment.

9. A sampling system for testing a series of items for a predetermined characteristic, comprising a plurality of members each independently movable to respectively different settings, a plurality of manually actuated keys one for each member, to index such member to successive incremental settings representative of said characteristic, a device for subjecting said items to test them for said characteristic and to produce a current representative of the value of such characteristic, an electric indicator connected to said test device having a movable indicator element responding to said current, and a stationary indicator having a series of indicator lines one for each of said keys said indicator lines being positioned between said meter and keys to indicate visually and directly the particular key to be operated in accordance with the setting of said movable indicator.

References Cited in the file of this patent
UNITED STATES PATENTS

| 2,390,569 | Ziebolz | Dec. 11, 1942 |
| 2,599,709 | Griesinger | June 10, 1952 |
| 2,708,070 | Fiechter | May 10, 1955 |
| 3,101,555 | Armand et al. | Aug. 27, 1955 |